(12) United States Patent
Kammer et al.

(10) Patent No.: US 6,392,422 B1
(45) Date of Patent: May 21, 2002

(54) MONITORING INSULATION AND FAULT CURRENT IN AN A/C CURRENT NETWORK TO PROVIDE LOAD SHUTOFF WHENEVER DIFFERENTIAL CURRENT EXCEEDS A CERTAIN RESPONSE VALUE

(75) Inventors: Michael Kammer, Hungen; Karl-Hans Kaul, Feldatal; Dieter Hackl, Fernwald, all of (DE)

(73) Assignee: Dip.-Ing. Walther Bender GmbH & Co. KG, Grunberg (DE)

( * ) Notice: Subject to any disclaimer, the term of this patent is extended or adjusted under 35 U.S.C. 154(b) by 0 days.

(21) Appl. No.: 09/446,350
(22) PCT Filed: Jun. 15, 1998
(86) PCT No.: PCT/EP98/03579
§ 371 Date: Apr. 14, 2000
§ 102(e) Date: Apr. 14, 2000
(87) PCT Pub. No.: WO98/58432
PCT Pub. Date: Dec. 23, 1998

(30) Foreign Application Priority Data

Jun. 17, 1997 (DE) .......................................... 197 25 532

(51) Int. Cl.$^7$ ........................ G01R 27/28; G01R 31/14; H02H 3/00
(52) U.S. Cl. ...................... 324/650; 324/509; 324/551; 361/102; 361/94
(58) Field of Search ................................ 324/650, 519, 324/509, 510, 551, 76.12, 76.39, 76.44, 76.52, 76.68, 76.78; 361/94, 77, 45, 102, 42, 47

(56) References Cited

U.S. PATENT DOCUMENTS 4,405,966 A * 9/1983 Cavero ........................ 361/80

(List continued on next page.)

FOREIGN PATENT DOCUMENTS

FR  2 523 766 A  9/1983
GB  2 258 095 A  1/1993

*Primary Examiner*—Glenn W. Brown
*Assistant Examiner*—Wasseem H. Hamdan
(74) *Attorney, Agent, or Firm*—Frishauf, Holtz, Goodman, Langer & Chick, P.C.

(57) ABSTRACT

A method and device for monitoring insulation and fault current in an electrical alternating current network. The differential current formed by vectorial addition is detected between at least two network conductors. Load-cut occurs when the differential current exceeds a specific threshold value. In order to increase safety and to protect human beings, the amount of alternating current contained in the differential current is detected as a first network variable, and the network alternating current between at least both network conductors and between at least one network conductor and an equipotential bonding conductor or a neutral conductor is detected as a second network variable. The product between the amplitude of the amount of alternating current contained in the differential current and the cosine of the phase angle φ between both detected network variables is determined as a measure for the resistive fault current of the network and load cut-out occurs when the determined product exceeds a specific threshold value. The product can be calculated directly or, even better, it can be determined indirectly without knowledge of the individual variables. One particular advantage of this technique is that, by including DC components of the differential current, it enables work with all different types of currents in view of the fact that alternating current networks nowadays mainly consist of a large number of alternating current components which, like resistive AC components, involve fault currents endangering the lives of human beings. Thus, it is possible to ensure simultaneous protection of human beings and installations.

24 Claims, 5 Drawing Sheets

U.S. PATENT DOCUMENTS 4,609,865 A * 9/1986 Goodman et al. .......... 324/579
5,003,242 A * 3/1991 Liber ........................ 318/778
5,103,365 A * 4/1992 Uchida et al. .............. 361/102
5,420,740 A * 5/1995 MacKenzie et al. ......... 361/45
5,459,630 A * 10/1995 MacKenzie et al. ......... 361/45
5,521,482 A * 5/1996 Lang et al. ................ 318/800
5,940,256 A * 8/1999 MacKenzie et al. ......... 361/42

* cited by examiner

MONITORING INSULATION AND FAULT CURRENT IN AN A/C CURRENT NETWORK TO PROVIDE LOAD SHUTOFF WHENEVER DIFFERENTIAL CURRENT EXCEEDS A CERTAIN RESPONSE VALUE

FIELD OF THE INVENTION

The invention relates to a method and a device for monitoring insulation and fault current in an electrical alternating current (AC) network, in which the differential current, formed by vectorial addition, between at least two network conductors is ascertained, and a load shutoff is performed whenever the differential current exceeds a certain response value.

BACKGROUND OF THE INVENTION

In electrical networks, because of defective insulation, fault currents can flow out via ground or via a protective conductor. The voltage drop generated by the fault current can be dangerous to human beings at parts that are touchable but in normal operation are voltage-free (indirect touch). If open, voltage-carrying parts of a current circuit are touched directly, a fault current can flow via human beings and is limited only by the resistance of the human body. Aside from harmed human beings, fault currents can also cause property damage, by influencing electrical systems or by the development of heat energy at the point of the fault. To protect against danger to human beings and property damage from fault currents, in addition to other protective provisions, fault current protection switches (FI protection switches or RCDs) are used. These devices, via a summation current converter, form the vectorial sum of the currents of the network conductors, and, from the outcome of the total differential current, its amount. The total differential current can include AC components and, when DC consumers are connected, such as drives with frequency rectifiers and a DC intermediate circuit, they can also contain DC components. If the total differential current exceeds a certain limit or response value, then the defective current circuit is turned off.

Fault current protective switches, as is generally known to professionals in the field, can be used only with networks of a certain size, because otherwise the natural capacitive leakage currents become greater than the necessary fault current limit value for protecting human beings. The consequences are defective or unintended or unnecessary load shutoffs.

SUMMARY OF THE INVENTION

It is therefore an object of the present invention to embody a method of the type defined at the outset such that by distinguishing resistive fault currents from normal capacitive network leakage currents, it can be employed without problems even in relatively large AC networks, and that even in smaller networks, it allows more-accurate monitoring of the fault currents.

This and other objects are attained in accordance with the present invention, wherein the AC component of the differential current is detected as a first network variable; the AC network voltage between at least two network conductors, or between one network conductor and an equipotential bonding conductor or a neutral conductor, is detected as a second network variable; the product of the amplitude of the AC component of the differential current and the cosine of the phase angle $\Phi$ between the two network variables detected is ascertained as a measure of the resistive fault current of the network; and the load shutoff is performed whenever the ascertained product exceeds a certain response value.

Such a method is extremely versatile in use and allows both reliable and accurate network monitoring in a way that is not vulnerable to malfunction, in single or multiphase AC networks. This is also particularly true for relatively large AC networks with correspondingly larger natural (capacitive) network leakage currents, in which professionals in the field had until now assumed that reliable fault current or insulation monitoring by means of fault current protection switches and summation current converters was impossible.

In electrical AC networks, consumers that are capable of generating direct leakage and fault currents are used more and more often and actually uncontrollably. These direct currents are caused by electronic elements, such as rectifiers, thyristors, TRIACs or transistors, which are used to convert the alternating voltage into a direct voltage or into an alternating voltage of a different frequency. If insulation faults occur behind these elements, then the fault current includes major DC components. Examples of such devices are primary-clocked switched-mode power supplies in electrical equipment, rectifiers and interrupt-free power supplies or frequency inverters for variable-rpm motor drives, which are all being used increasingly.

It is thus especially advantageous for safety reasons to be able to take into account not only resistive AC components of the network, but also, in accordance with claim 8, to provide differential current detection that is sensitive to universal current, that is, one in which even DC components, which must always be assessed as being resistive, can be taken into account. This makes substantially more versatile and safe use possible, even in the presently typical AC networks that have considerable DC components.

It is advantageous for the differential current, detected with universal current sensitivity, to be split into an AC component and a DC component, the latter always to be addressed as a fault current, as well as to ascertain the resistive AC fault current signal from the AC component and then to add the resistive AC and DC fault currents quadratically. Preferably, the AC component after being filtered out is immediately subjected to frequency weighting for the sake of protecting human beings, an example being low-pass filtration that simulates the frequency dependency of the human body.

According to another aspect of the present invention, two limit or response values of different magnitude are provided, namely a lesser one, of 30 mA, for instance, for a comparison with the ascertained resistive fault current, and a greater one, for instance of 300 mA, for a comparison with the total differential current that has been detected with universal current sensitivity. If the limit value is exceeded, a load or network shutoff is effected. The limit values can be adjustable, and they can also be adapted flexibly to prevailing network conditions.

In extensive networks, until now, it was impossible to use fault current devices with limit values for protecting human beings, if for no other reason because the natural leakage current, which was present because of how the installation is constructed and in many cases was not reducible, was above the limit value of the protection device. In many applications, such as on construction sites with cables that can be damaged during the work, this is highly problematic and even today often leads to accidents. Since in the present method the resistive fault current is ascertained in a targeted way as part of the total differential current and evaluated, for the first time appropriate distinctions and separate monitoring for protecting human beings and protecting equipment are possible. No ways of attaining this in a similar way were known, even though the problem of high leakage currents, which initially made it seem impossible to protect human beings via an FI or fault current protective switch, had already existed ever since there had been electrical distribution networks.

Two different limit or response values are provided, which are also differently frequency-weighted, to make it possible simultaneously to protect both human beings and property. Until now, either only a fault current protection provision with a low limit valve (such as 30 mA) could be used for protecting human beings, or a property protection provision with a higher limit value (such as 300 mA) could be used. In the known passive devices until now, there was also no possibility of frequency weighting using a low-pass filter for protecting human beings and a universal pass filter for protecting property, because these passive devices had to be optimized to the network frequency because of the necessary sensitivity and therefore have only a very narrow bandwidth (approximately 30 Hz to a maximum of one kHz) even in experiments with active fault current protection devices (using auxiliary voltage and electronics, the frequency range had to be limited to approximately 1 kHz at the top by a low-pass filter, since in networks that include harmonics, the harmonics that they generated in the capacitive leakage currents (and not in the resistive fault currents) caused the equipment to trip at the wrong times.

In accordance with another aspect of the present invention in an AC network with an equipotential bonding conductor, enable functional monitoring of the equipotential bonding conductor. This is extremely advantageous for safety reasons, because if there is a fault in the equipotential bonding conductor, the entire network leakage current, or the total differential current detected with universal current sensitivity, can become a fault current that is dangerous to human beings. This dangerous situation can be detected in that in the equipotential bonding conductor, a comparatively high current drop is ascertained, which in the worst case is down to the value of zero. In the normal situation, the total differential current is correspondingly split into the resistance of the protection conductor or equipotential bonding conductor and the resistance (grounding resistance) of an additional grounding means. Thus in the normal situation, proportionality exists between the total differential current and the current in the equipotential bonding conductor.

A load or network shutoff that in the case of a fault has universal polarity, or in other words a total shutoff, is preferred for safety reasons. This is true because this prevents the network from being turned on again even though the network still has insulation faults. Without that provision, an unnecessary, repeated, turn-on and turn-off would take place.

It is also an object of the present invention to create a device suitable for performing the method of the invention. To that end, a device having a differential current sensor that includes at least two network conductors of an AC network, and having a differential current relay, which via a power or load switch performs a load or network shutoff as soon as the differential current exceeds a certain response value, is characterized in that the differential current relay has an electronic phase module, which from the AC component of the differential current which component is ascertained via a high-pass filter, and from the AC network voltage or a comparison voltage derived from it, taking into account the phase angle $\phi$, a fault current signal is ascertained, which represents the AC-dictated resistive fault current of the AC network; and that the phase module is followed by a comparator module, which compares the fault current signal with a lesser response value suitable for protecting human beings and triggers the load switch to trip it if this response value is exceeded.

This device, with the phase module, enables effective realization and performance of the method of the invention. This is true above all in conjunction with the preferred characteristics of the refinement with universal current sensitivity, because as a result, a substantially larger area of potential application is gained, along with markedly greater safety. This is also true for the characteristics of the attendant separate monitoring for protecting human beings (with a lesser resistive fault current) and for protecting property (with a greater total differential current, which also includes the high capacitive leakage currents that rise with the size of a network).

Fault current protection circuits that are based on the principle of magnetic summation current or differential current detection have been known since the 1920s. Only in the 1960s, however, was a response sensitivity attained that made protection of human beings by low response values (10 to 60 mA) fundamentally possible. In Germany, up to the present day, only fault current protection devices independent of network voltage have been described by the standards and employed for protecting persons against direct and indirect touch. Fault current protection devices independent of network voltage detect the differential current of a network with the aid of a magnet core through which the current-carrying network conductors are passed and which has a secondary winding in which a voltage is induced if a differential current occurs. The secondary side is terminated in such a way that the induced voltage can drive a sufficiently high current that then electromagnetically actuates a switch lock, which with switch contacts disconnects the network. The tripping system is electrically and mechanically adapted such that the tripping takes place at a fixed response value (for protecting human beings, typically 30 mA). The relatively low actuation energy available requires very sensitive adaptation between the sensor system and the magnet system, including the mechanics for disconnecting the switch contacts. To prevent the sensitive mechanics from becoming "more sluggish" because of deposits and thus to prevent the response value from being raised to the point that under some circumstances no tripping occurs, the system has to be regularly "put into motion". This is done by actuating a test key, which simulates a differential current and trips the fault current protective switch. In practice, however, fault current protection switches are not tested as required, and thus in the case of a fault the protection provision is often not guaranteed.

Auxiliary-voltage-dependent electronic systems, which do not have this disadvantage, have until now not been permitted, for safety reasons. Up to now, it has been assumed that because of possible failures of electronic components, the protection provision in the event of a fault could not be guaranteed.

With the fault current protection device of the present invention, however, this prejudice is overcome, and this involves an extremely safe, auxiliary-voltage-dependent electronic system that is supplied from the network to be monitored. By various provisions, very high functional reliability is attained, which far exceeds that of conventional devices. The system has constant self-monitoring of function, with a load or network shutoff if an equipment fault occurs. A redundant voltage supply is provided, which remains functional even if some parts fail. A storage capacitor itself assures safe shutoff even if there is a defective voltage supply.

The function of the equipotential bonding conductor can be reliably monitored. This process can—but need not—be done with universal current sensitivity.

The use of a digital interface becomes possible only with the use of electronic circuitry and opens up completely new possibilities. As a result, even completely different safety-relevant measurement variables, known in a different context, can be used as further shutoff criteria. This is true for instance for the insulation resistance of the shut-off network, or for the resistance of the grounding in the fault current protection device. This combination of insulation monitoring, known only from an insulated IT network, with a fault current protection device (which can be used for both grounded and insulated networks) is novel and leads to surprising combination effects. In addition, the novel fault current protection device can now take on the new task of precautionary monitoring, by monitoring instances of where the insulation is becoming worse. As a result, it is now possible to prevent an incipient shutoff by performing early maintenance or troubleshooting. This is true especially because the fault current that indicates only a worsening with respect to property is selected in a targeted way.

BRIEF DESCRIPTION OF THE DRAWINGS

The invention will be described in further detail below in conjunction with a plurality of drawings. Shown are.

DETAILED DESCRIPTION OF THE PREFERRED EMBODIMENTS

Figure 1A:
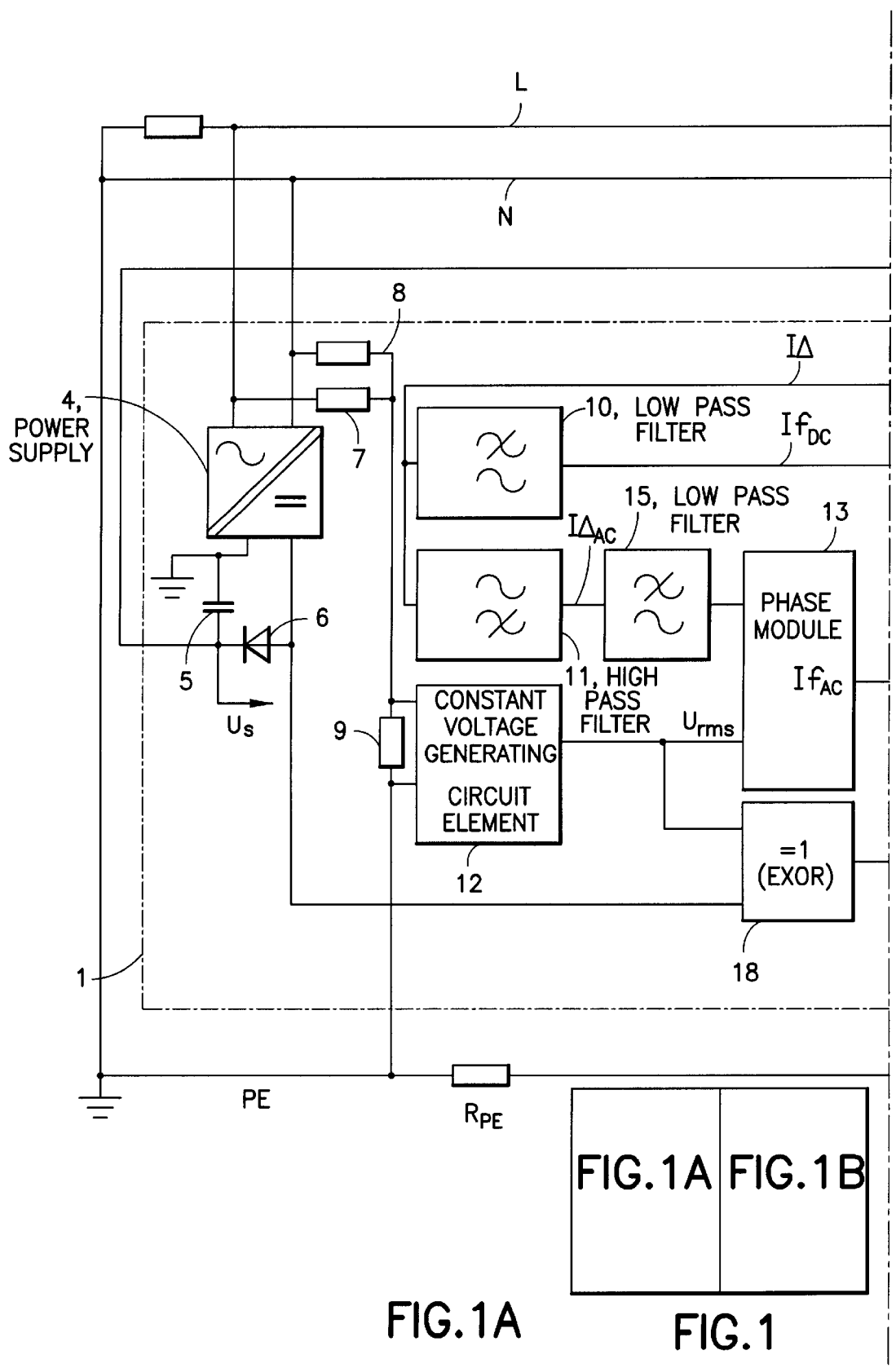
FIG. 1, in a block circuit diagram, a device according to the present invention.

First, the principle of the invention will be described in general with reference to a simplified block circuit diagram from FIG. 5. This figure shows a grounded single-phase AC network with two conductors—namely a network conductor L and a neutral conductor N—and with an equipotential bonding conductor PE. Both $C_E$ and $R_E$ symbolize the natural capacitive and resistive network leakages (network leakage impedances) of the AC network (and of a possible DC side of the network).

The AC network can be connected to a consumer or load V in the form of a consumer device, via a universal-polarity, in the present case 2-pole, disconnection or load switch 2. This connection can be made as shown with the interposition of a rectifier GL. $C_{E+}$ and $R_{E+}$, $C_{E-}$ and $R_{E-}$, symbolize the natural capacitive and resistive network leakages (network leakage impedance), respectively, of the DC side of the AC network. The housing of the consumer is additionally grounded, which is represented in the drawing by the grounding resistance $R_G$. This involves the total grounding resistance of all the grounding means present in the network. The line resistance of the equipotential bonding conductor PE is designated $R_{PE}$ and is practically parallel to the grounding resistance $R_G$.

The two conductors L and N are carried through a summation current converter or differential current sensor 3, which forms the vectorial sum of the currents in the conductors L and N, or in other words the differential current of them. The differential current should be as low as possible, and is larger, the smaller the network leakage impedances are. The differential current is the product of ohmic and capacitive components, with the ohmic components forming the fault current and the capacitive components forming the unavoidable capacitive leakage current, which in particular also rises with the network variable.

The differential current can in addition—for instance if there are downstream rectifiers or inverters—contain DC components in addition to AC components. If the differential current sensor is supposed to detect the DC components as well, then it must be designed to be sensitive to universal current. Such differential current sensors with universal current sensitivity are known per se and can for instance function as described in conjunction with FIG. 6.

The differential current detected by the differential current sensor 3 splits, if there is an equipotential bonding conductor PE, and flows via the grounding resistance $R_G$ and via the line resistor $R_{PE}$ of the equipotential bonding conductor.

Figure 5:
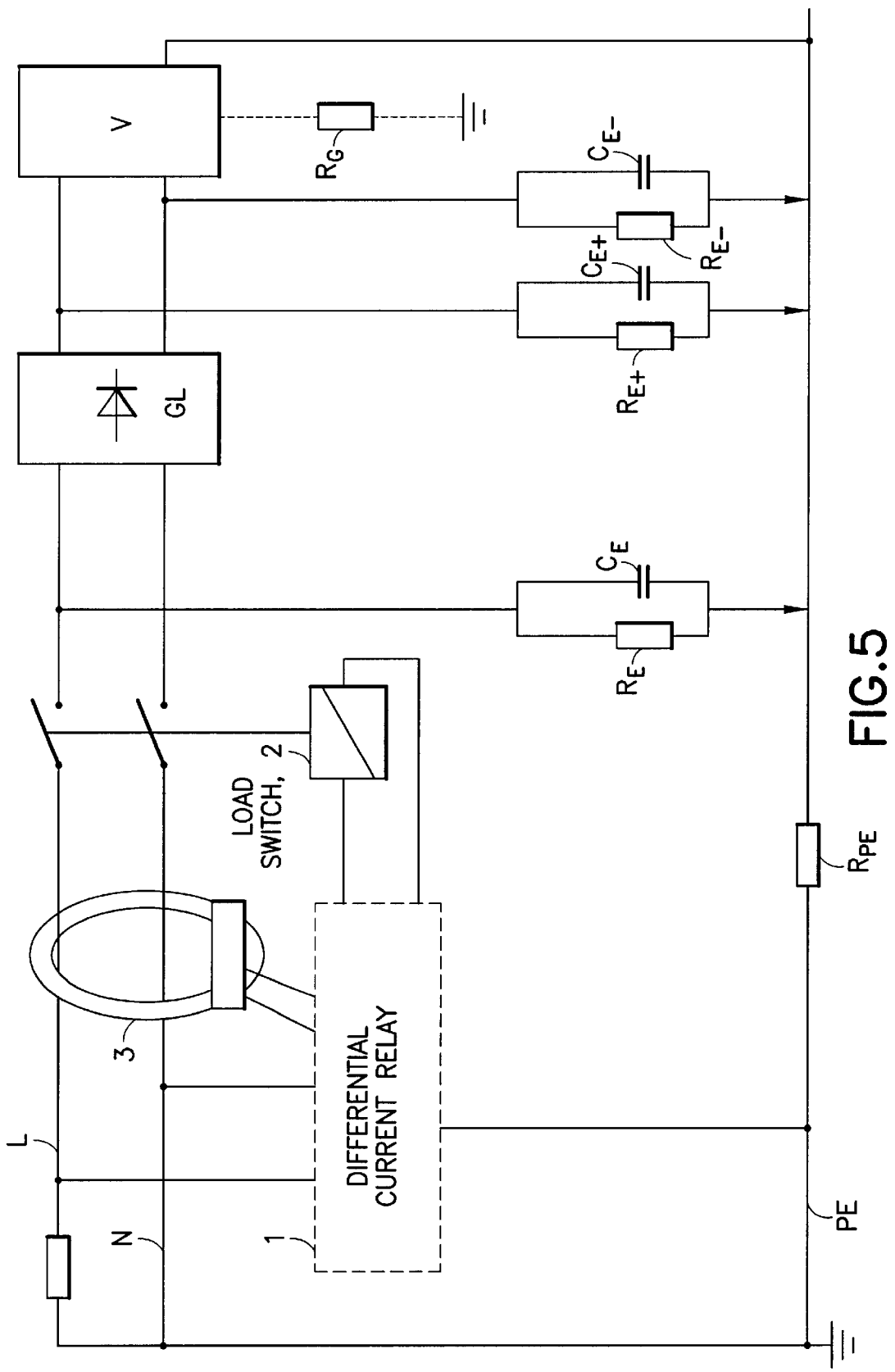
FIG. 5, a device according to the present invention in a simplified block circuit diagram.

In FIG. 5, in an evaluation circuit in the form of a network-supplied differential current or fault current relay 1, first the AC component of the differential current of the network conductor L and neutral conductor N is detected, as a first network variable. Also in the differential current or fault current relay 1, the AC network voltage between the network connector L and the neutral conductor N or other conductors is detected, as a second network variable. The phase angle φ between the first and second network variables can then be determined in the differential current relay 1. Finally in the differential current relay 1, the product of the amplitude of the AC component of the differential current and the cosine of the phase angle φ between the two network variables detected is ascertained, as a measure for the resistive fault current of the network. The product can be calculated directly from the individuals detected, or it can be ascertained indirectly without this kind of individual detection (for instance of the phase angle φ). This indirect ascertainment will be described in further detail below.

Also in the differential current or fault current relay 1, the DC component of the differential current that can be detected with universal current sensitivity is evaluated and taken into account, assuming that the differential current sensor 3 does operate with universal current sensitivity. This DC component should always be assessed as fault current and could be added quadratically to the fault current on the AC side. If there are different limit values for AC and DC, then it can also be treated in a separate evaluation circuit.

The aforementioned product between the amplitude of the AC component of the differential current and the cosine of the phase angle φ, or in other words the resistive fault current on the AC side, is compared—optionally after the quadratic addition of the resistive DC fault current—with a predetermined, optionally adjustable limit or response value. As soon and as long as the product exceeds this value, the differential current relay 1 triggers a relay of a power or load switch 2, which disconnects the load V from the AC network with universal polarity.

Figure 1B:
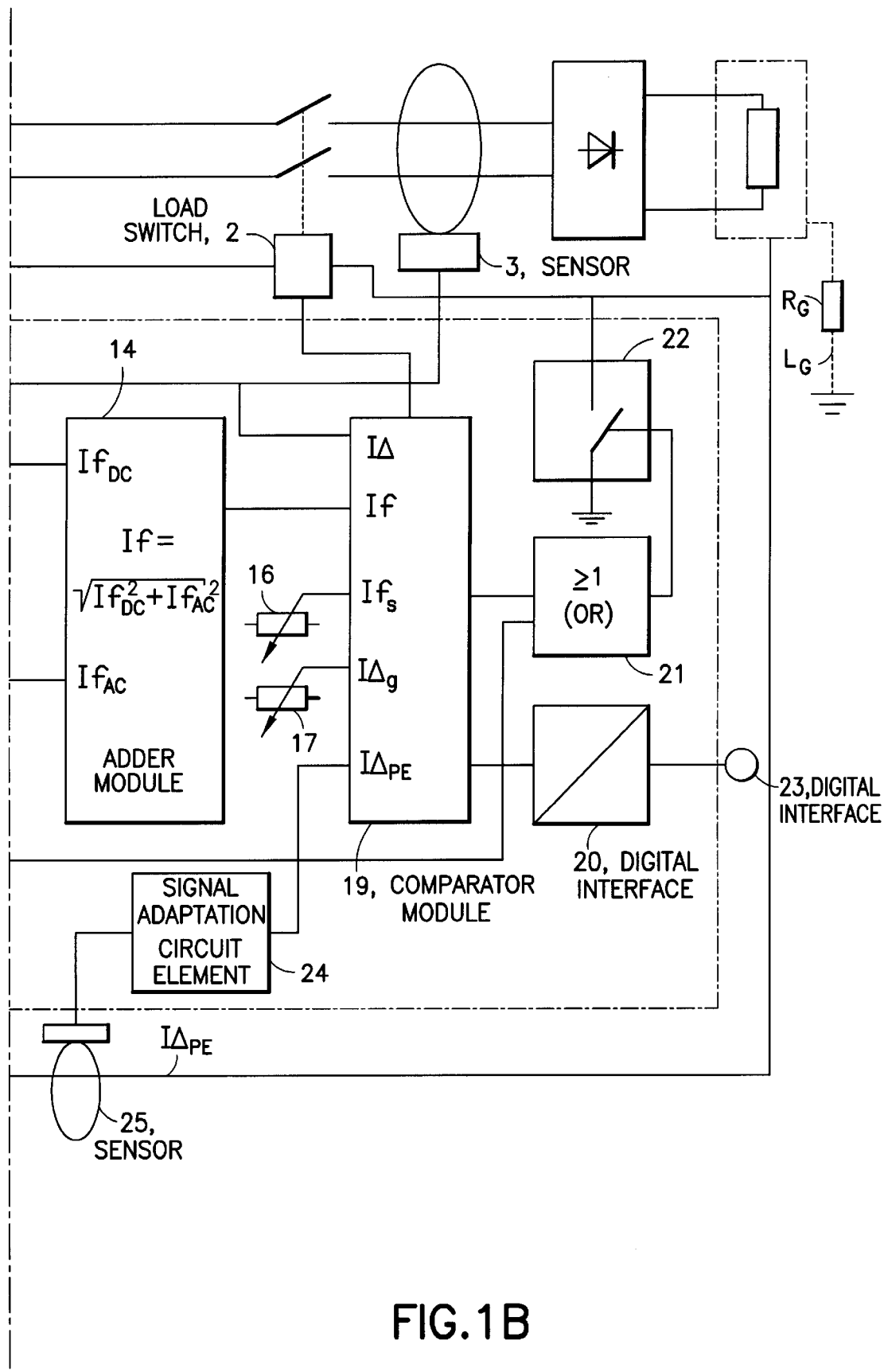

FIG. 1, in a more-detailed illustration, in particular shows the differential current relay 1 of FIG. 5 in conjunction with an AC network to be monitored. This network can be grounded (as in the present case) or ungrounded; it can be a single-phase network or a three-phase network, with or without directly connected rectifiers or inverters. By means of the measuring method that has universal current sensitivity, differential currents IΔ are detected which comprise natural capacitive leakage currents in the AC or alternating current portion of the network and can also include fault currents that occur from insulation faults in the AC or DC part of the network.

A device for a three-phase electrical AC network is distinguished solely in the fact that the power supply is supplied from all three phases, and that the components 7, 9, 12, 13, 18 to be described hereinafter are present once for each phase.

The device detects the differential current of the network, which is a measure for the impedance of the network to ground. The differential current can include a resistive component (fault current) that occurs from ohmic insulation faults.

In the present case the device substantially comprises a differential and fault current relay 1, a differential current sensor 3 with universal current sensitivity for detecting the differential current IΔ of the network, along with a second current sensor 25 for detecting the (leakage) current in the equipotential bonding conductor PE of the network, and a power or load switch 2, which if a limit value of the fault current or of the total differential current is exceeded disconnects the network from the supply with universal polarity.

At the output of the differential current sensor 3 (see FIG. 1), a measurement signal IΔ appears, which is proportional to the differential current of the conductors L, N passed through the sensor and which includes the AC component and optionally also the DC component of the differential current. In a low-pass filter 10, which has a limit frequency, for instance of 10 Hz, that is below the network frequency, the DC component $IF_{DC}$, which must also be assessed as an ohmic fault current, is separated.

Via a high-pass filter 11, which has a limit frequency, for instance of 15 Hz, that is above the limit frequency of the low-pass filter 10, the AC component $I\Delta_{AC}$ of the differential current IΔ is filtered out. The AC component $I\Delta_{AC}$ then passes through a suitable frequency-weighting low-pass filter 15, which simulates the frequency dependency of the human body. That is, a suitable frequency weighting of $I\Delta_{AC}$ takes place. The low-pass filter 15 serves to simulate the frequency dependency of the human body with respect to the touch sensitivity to electrical currents (as described for instance in IEC (International Electrotechnical Commission) 60479).

The AC component $I\Delta_{AC}$ of the differential current IΔ (even after the frequency weighting) includes the (natural) capacitive leakage current and any resistive fault current $If_{AC}$ that may be present. Both these variables can be ascertained with the aide of the phase relationship between the AC differential current and the AC network voltage, from the AC component that is filtered out. There are various possibilities for ascertaining it, which will be described in further detail hereinafter.

In the present case, to ascertain $If_{AC}$ via a double-phase coupled voltage divider 7, 8, 9 between the network and the equipotential bonding conductor PE and via a constant voltage generating circuit element 12 at its output, a comparison or substitute voltage $U_{rms}$ is generated, which represents the network voltage U with the effective value kept constant. In a phase module 13, the substitute voltage $U_{rms}$ and the frequency-weighted AC component $I\Delta_{AC}$ of the differential current IΔ is treated in such a way that at the output, the AC component of the resistive fault current $If_{AC}$ occurs. This means that in the phase module 13, indirectly (that is, without calculation), the product, representing the effective component, of the amplitude of the AC component $I\Delta_{AC}$ of the differential current IΔ and the cosine of the phase angle φ is ascertained. This principle is preferably based on an effectiveness measurement, does not require any individual knowledge of the phase angle φ, and will be described in further detail below in conjunction with FIG. 4.

If needed, along with the resistive fault current, the leakage current (in the form of the capacitive component of the AC component $I\Delta_{AC}$ of the differential current IΔ) can also be ascertained in the phase module 13.

In an adder module 14, the resistive DC component $If_{DC}$ and the resistive AC component $If_{AC}$ are combined by quadratic addition into a total fault current or total fault current signal If. The fault current signal If and the untreated total differential current IΔ are delivered to a comparator module 19, which may be embodied as a discrete circuit, microcontroller or ASIC. The comparator module 19 includes two adjusting means 16, 17 for specifying a lesser response or limit value $If_g$ for the fault current signal If and a greater response or limit value $I\Delta_g$ for the total differential current IΔ. As soon as one of the response or limit values is exceeded, the comparator module 19, via a logical OR element—OR element 21—triggers a switch 22, which actuates the power or load switch 2 and performs the network disconnection.

Besides the resistive fault current If, which is definitive for the touch safety, the total leakage current, or in other words the total differential current IΔ, is also a measure of the safe status of the network. For the operating safety of an electrical network, it is appropriate to monitor the apparent power by means of the total differential current. To that end, the total differential current IΔ must not, like the AC component $I\Delta_{AC}$ of the differential current IΔ, be frequency-weighted via a low-pass filter. By means of the separate comparison of the resistive fault current If with a first, lesser response or limit value $If_g$, for instance of 30 mA, and the total differential current IΔ with a second, greater response or limit value $I\Delta_g$, for instance of 300 mA, protecting human beings and property can be combined in a single device. The specification of the response or limit values can be fixed or variable. These values can also be adapted flexibly to a given status of an installation. For example, one criterion for the touchability of parts of an electrical installation is the so-called touch voltage. Internationally, a maximum limit value of 50 V AC or 120 V DC has been set, because even if the stress persists these values are harmless. If this limit value is to be adhered to, the product of the leakage current and the total grounding resistance $R_{erdung}$ ($R_{erdung}$=parallel connection of $R_G$ and $R_{PE}$) in operation must in each case be less than one of the aforementioned voltages. The adherence to this condition will be checked by measurement technology when an electrical network is put into operation upon an installation, and at regular intervals.

If a supplemental device, which continuously measures the total grounding resistance during operation is connected via a digital interface 20, 23 and transmits the current measured value to the fault current protection device via the digital interface, then the limit values for the leakage current can be formed using the following calculations:

$$I\Delta_{gAC}=50\ V/R_{erdung}$$

$$I\Delta_{gDC}=120\ V/R_{erdung}$$

The low-impedance equipotential bonding conductor PE, whose line resistance is symbolized as $R_{PE}$, in an electrical system without faults assures that the touch voltage and thus the touch current will remain below allowable values. If the equipotential bonding conductor PE is interrupted, however, the natural leakage current of the network can become fault current. This applies for instance for a person in contact with the ground who is touching a normally grounded part of the electrical network. As a result of the PE interruption, this part can assume a higher touch voltage, and as a result a dangerous fault current can occur.

In this case of an interruption of the equipotential bonding conductor PE, the fault current can be virtually purely capacitive and can fail to be detected by the above-described parts of the device. To enable reliably shutting off the network in this case as well, the current $I\Delta_{PE}$ in the equipotential bonding conductor PE can additionally be detected via the current converter or differential current sensor 25 and delivered to the comparator module 19, via a signal adaptation circuit element 24 serving the purpose of measured value adaptation.

In addition to grounding the touchable parts of the electrical system, additional grounding of these parts can exist via the location that is conductively connected to the ground, or via other conductive mechanical connections (such as water conduits for cooling). The grounding resistance resulting from this additional grounding is designated $R_G$.

The total differential current detected with the differential current sensor 3 includes the sum of the two currents $I\Delta_{PE}$ and $I\Delta_g$. The current $I\Delta_{PE}$, measured in the protective conductor or equipotential bonding conductor PE, is proportional to the total differential current $I\Delta$ in accordance with the equation $I\Delta_{PE}=I\Delta-I\Delta_g$. In operation of a network, a constant ratio between the resistance $R_{PE}$ of the equipotential bonding conductor and the resistance $R_G$ of the additional grounding can be made a prerequisite. Thus any change in the total differential current is always expressed as a proportional change in the current in the equipotential bonding conductor. This fact can be utilized for shutting off the network safely even if the leakage current becomes fault current because of a failure of the equipotential bonding conductor PE.

It is additionally possible, via a second current converter, not shown, through which the equipotential bonding conductor PE is inserted, to impress a low-current into the loops of $R_{PE}$ and $R_G$, and via a third current converter, not shown, through which the PE is again inserted, to monitor the loop resistance from the series circuit of the two resistors $R_{PE}$ and $R_G$.

In a fault current protection device, the highest possible reliability and functional safety should be a prerequisite. For this purpose, conventional devices have a test key, which should be actuated regularly in order to test the availability of the protective provision. As a rule, however, this necessary checking is done extremely seldom. As a result, the electromagnetically actuated conventional fault current protective switches often no longer trip if a fault situation actually arises.

The device described here has a plurality of monitoring mechanisms that assure the functional safety. Since it is a network voltage dependent device, it must be assured that fault currents that are above the limit values will always lead to shutoff of the network, and that the shutoff will be done even if functional faults occur in the device that could lead to the shutoff not being done in the case of a fault. This problem is solved by the following provisions: The supply to the differential and fault current relay is done redundantly in three-phase networks. This assures that if a phase fails or a neutral conductor fails, the device will continue to operate as long as two phases, or one phase and the neutral conductor, are still available.

To assure the protective function even whenever all the phases except for one have failed, or if in a single-phase system the neutral conductor fails, a storage capacitor 5 is charged from the direct supply voltage of a network-supplied internal power supply 4 via a decoupling diode 6. From this storage capacitor, via Us, the circuit elements 18, 21, 22 are supplied redundantly for a period of time if the internal supply voltage fails. During this period of time, it is ascertained via the voltage divider 7, 8, 9 whether a network conductor is still carrying voltage to ground. If so, the power switch 2 is tripped via the Exclusive OR element (EXOR) 18, as well as the (OR) element 21, and the switch 22, with the energy from the storage capacitor 5. If the entire network is shut off, then because of the EXOR linkage, no shutoff of the power switch 2 takes place.

Checking of the connection of the differential current convertors can also be done simply, in the measuring method with universal current sensitivity, by monitoring the presence of oscillation at the sensor, and if the oscillation frequency varies or the oscillation breaks down, a defect is detected.

In order to assure that the power switch 2 is in fact connected, its coil resistance is measured continuously, with the aid of a low superimposed direct current. With the same provision, the connection of the differential current converters 3 and 25 is checked continuously.

An insulation monitoring device can be connected to the digital interface 20, 23; it monitors the insulation resistance of the network to be monitored when it is in the off state and prevents the power switch 2 from being turned on if the insulation resistance is below a predetermined value. As a result, turning the network on again is prevented until the insulation resistance is again at an acceptable minimum value. It is also possible to connect a device, already mentioned, for monitoring the resistance $R_{PE}$ of the equipotential bonding conductor PE and a device for displaying or digitally further processing the measurement data of the device to the digital interface 20, 23.

The resistive AC fault current $If_{AC}$ is an effective current $I_W$. This current is equivalent to the product of the amplitude of the AC component of the differential current and the cosine of the phase angle $\phi$ and can be calculated directly or ascertained indirectly.

In the direct calculation of this effective current $I_W$, using comparators and time measuring instruments, the phase relationship $\phi$ between the AC component $i(t)=I\Delta_{AC}(t)$ of the differential current $I\Delta(t)$ and the AC network voltage $u(t)$ is ascertained. It is possible for instance to evaluate the zero crossovers and the direction of the slope. As one parameter, the period length T of the AC network voltage is determined by measuring the time between two zero crossovers with a slope with the same sign (+ or −). As a second parameter, the time t between a zero crossover of the AC network voltage $u(t)$ and the next zero crossover of the AC component of the AC component $I\Delta_{AC}(t)$—with the slope of the same sign—is determined. The phase angle $\phi$ is then calculated from the formula $\phi=t\cdot 2\cdot\phi/t$. After the amplitude of the AC component $I\Delta_{AC}(t)$ of the differential current $I\Delta(t)$ is ascertained (for instance via a peak value measurement), the effective current $I_W$, that is, the resistive fault current $If_{AC}$ on the AC side, can be calculated from the following formula:

$$I_w = \hat{i} \cdot \cos(\phi)$$

In the three-phase network, the determination of the phase angle $\phi$ and the calculation in accordance with equation 2 should be performed individually for each network phase; the individual results are either to be added quadratically, or the individual result with the highest amount is adopted as the final result.

In practical terms, this method of direct calculation of the effective current $I_W$ can be used only for signals that are as sinusoidal as possible. As the proportion of harmonics and noise rises, the correct zero crossover and the attendant ascertainment of the phase angle can be determined only with major errors.

Figure 2:
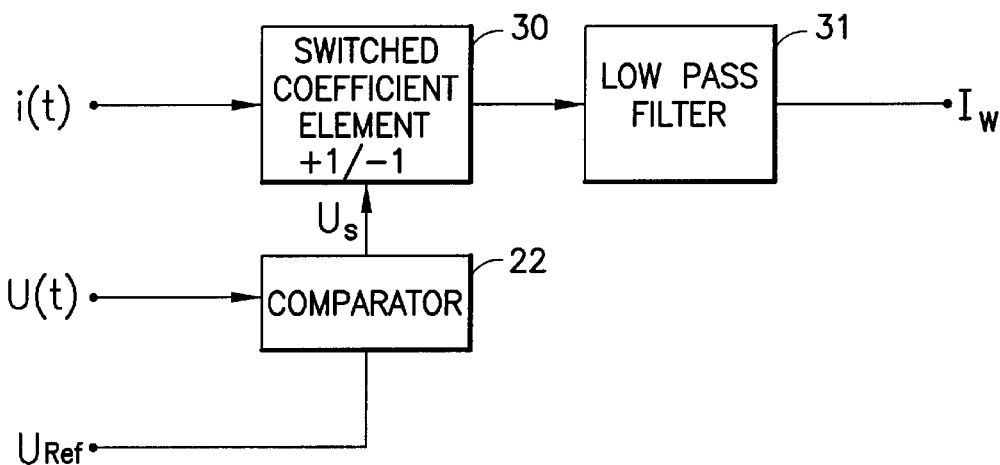
FIG. 2, in a block circuit diagram, a synchronous rectifier with a switched sign (+ or −) for ascertaining an operative current or fault current.
Figure 3:
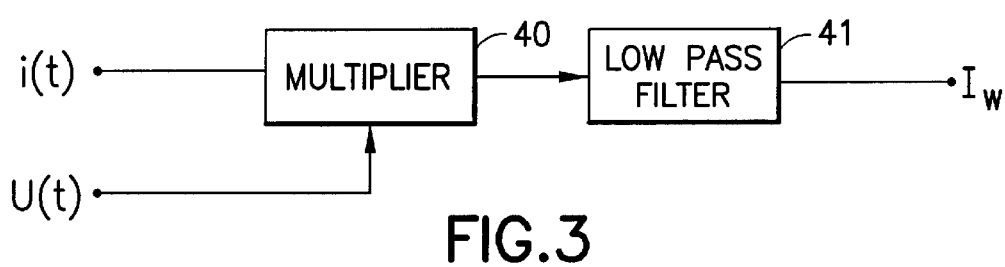
FIG. 3, in a block circuit diagram, a synchronous rectifier with a multiplier for ascertaining an operative current or fault current.
Figure 4:
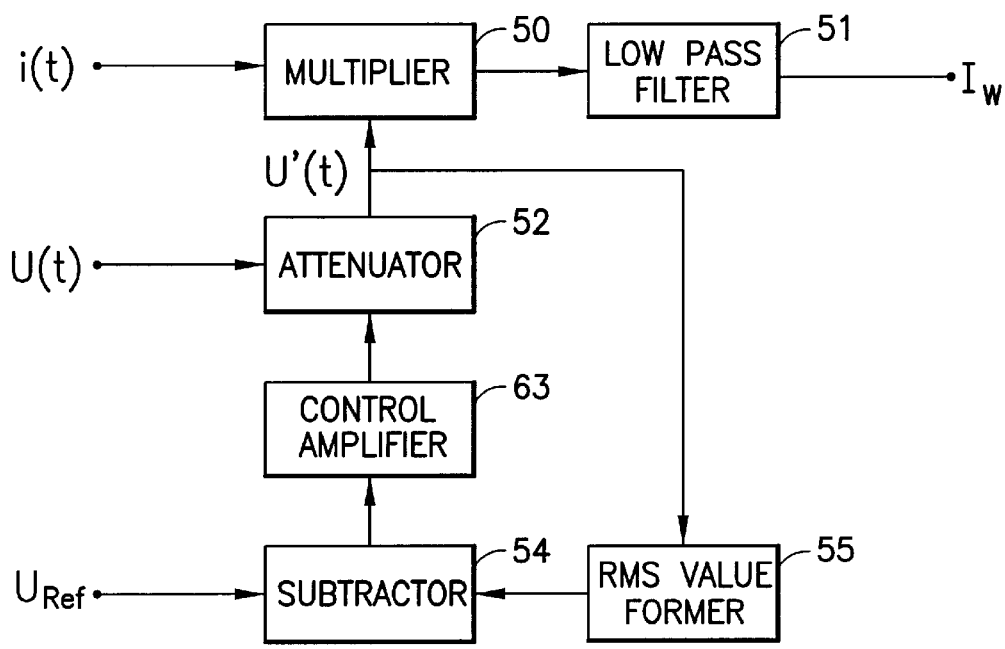
FIG. 4, in a block circuit diagram, the ascertaining of an operative or fault current on the basis of effectiveness measurement.

With reference to FIGS. 2 through 4, three methods will now be described for indirect ascertainment, that is, without calculation) of the resistive fault current $If_{AC}$ on the AC side, or in other words, the effective current $I_W$.

In FIG. 2, i(t) corresponds to the leakage current, or the AC component $i(t)=I\Delta_{AC}(t)$ of the differential current $I\Delta(t)$ and u(t) of the AC network voltage. The reference voltage $U_{Ref}$ of a comparator 32 will hereinafter be defined as 0 V. If the AC network voltage is greater than 0 V, then the output voltage $U_s$ of the comparator controls a switched coefficient element 30 in such a way that the AC component or the leakage current on the AC side is multiplied by a constant coefficient, such as +1. If the AC voltage of the network becomes less than 0 V, then the output voltage of the comparator 32 adjusts such that the coefficient effective for i(t) comes to have the same amount but a changing sign, such as −1. A low-pass filter 31, in the ideal case, forms the arithmetic mean value of the output signal of the coefficient element 30 over one period of u(t).

The output signal of this synchronous rectifier thus occurs from a convolution of the alternating coefficient (rectangle with the amplitude +/−1) and from the leakage current i(t). One signal component of the input signal, weighted with the amplitude of the spectral line, will appear as an output signal component at each spectral line of the coefficient rectangle. This means that in a coefficient rectangle with the amplitude 1, all the odd-numbered frequency components of i(t) are weighted as follows:

$$\bar{I}_a = \frac{2}{\pi \cdot m} \hat{i} \cdot \cos(\varphi_m)$$

for all values of m=2·n+1, where n=0, 1, 2, 3, etc.

Ideally, all the signal components of i(t) that do not correspond to the odd-numbered multiple of the frequency of u(t) will be suppressed. Even DC components are suppressed. This means that harmonic components in i(t) toward higher frequencies are taken into account only attenuated, in accordance with the spectral components of a symmetrical rectangle. Along with this frequency selectivity, the phase-assessment property exists by way of the term $\cos(\phi)$ in the above equation.

If u(t) and i(t) are synchronous signals with a phase displacement of 0°, and if i(t) is a purely sinusoidal alternating current, then m=1, $\cos(\phi)$=1, and from the above equation, $$\bar{I}_a = \frac{2}{\pi} \cdot \hat{i}$$

This is equivalent to the arithmetic mean value of a completely rectified signal. If u(t) and i(t) are synchronous signals with a phase displacement of 90°, and if i(t) is a purely sinusoidal alternating current, then m=1, $\cos(\phi)$=0, and from the above equation, $I_a$=0. This means that capacitive components in the leakage current (90° phase displacement) are suppressed.

The advantage of this method of FIG. 2 over the method of direct calculation is that noise and interference signals in the leakage current are well suppressed. However, this method reacts sensitively to noise and interference signals in u(t). Harmonic components in i(t) are indeed taken into account, but enter into the result with the wrong weighting.

In the three-phase network, one synchronous rectifier should be used for each network phase. Either the quadratic sum of all the output signals, or the output signal with the highest amount, then serves as the result.

In FIG. 3, i(t) again corresponds to the leakage current or the AC component $i(t)=I\Delta_{AC}(t)$ of the differential current $I\Delta(t)$. A low-pass filter 41 has the same function as the low-pass filter 31 of FIG. 2. If for the signal u(t) a symmetrical square signal, extending synchronously to the AC network voltage, that has the amplitude 1 V and a DC component of 0 V is selected, then the behavior of the circuit corresponds exactly to the circuit of FIG. 2. If conversely u(t) is a purely sinusoidal, network-synchronous voltage of constant amplitude without a DC component, then only the fundamental of the signal i(t) of this circuit is phase-weighted. The DC components, harmonics, noise or interference signals are suppressed.

With the prerequisite 1 V amplitude of u(t) and the use of a factorless multiplier 40, the effective current $I_W$ for the network-frequency fundamental of i(t) is determined as:

$$I_W = \tfrac{1}{2} \cdot \hat{i} \cdot \cos(\phi)$$

Except for the factor ½, this equation is equivalent to the one mentioned in conjunction with the direct calculation. Thus once again, $\cos(\phi)$ is used to ascertain the effective current $I_W$, without knowledge of $\phi$ or $\cos(\phi)$ as a value.

One disadvantage of this method is its restriction to evaluating the fundamental of i(t). The insensitivity to interference voltages and noise is advantageous. Even noise present in u(t) is not as critical as in the methods described earlier above.

In FIG. 4, i(t) corresponds to the leakage current or the AC component $i(t)=I\Delta_{AC}(t)$ of the differential current $I\Delta(t)$, and u(t) corresponds to the AC network voltage. Function blocks 52 through 55 generate the copy u'(t) from the network voltage u(t), with the effective value kept constant. The following function blocks are provided: multiplier 50, low-pass filter 51, adjustable attenuator 52, control amplifier 53, subtractor 54, and RMS value former 55.

If u(t) were multiplied directly by i(t), then the result would be p(t), namely the instantaneous power converted into leakage impedances. If p(t) is integrated by way of integral multiples of one network period (low-pass filter 51), then the result is the effective power P, converted into the leakage impedances.

$$P = 1/T \cdot \int_{-n \cdot T} i(t) \cdot u(t) dt$$

If the term u(t) now becomes u'(t) with a constant RMS value (effective value), then the result of multiplication and integration corresponds to the current that is the source for the power converted into the leakage impedances, or in other words corresponds to the effective current $I_W$.

$$I_W = \frac{1}{T} \cdot \int_{-n^a T} i(t) \cdot \frac{u(t)}{U_{RMS}} dt$$

The correct detection of all the effective components present in i(t) is done theoretically with as wide a band as the circuits used allow, or in other words including all the direct and harmonic components. Correct detection of the direct components, however, is restricted by the fact that in actual practice, it is not the source voltage driving the leakage current that is used as u(t), but rather the network voltage as a simulation or copy of it.

In the three-phase network, the circuit of FIG. 4 should be constructed for each network phase. either the quadratic sum of all the output signals or the output signal with the highest amount is then used as the result.

Figure 6:
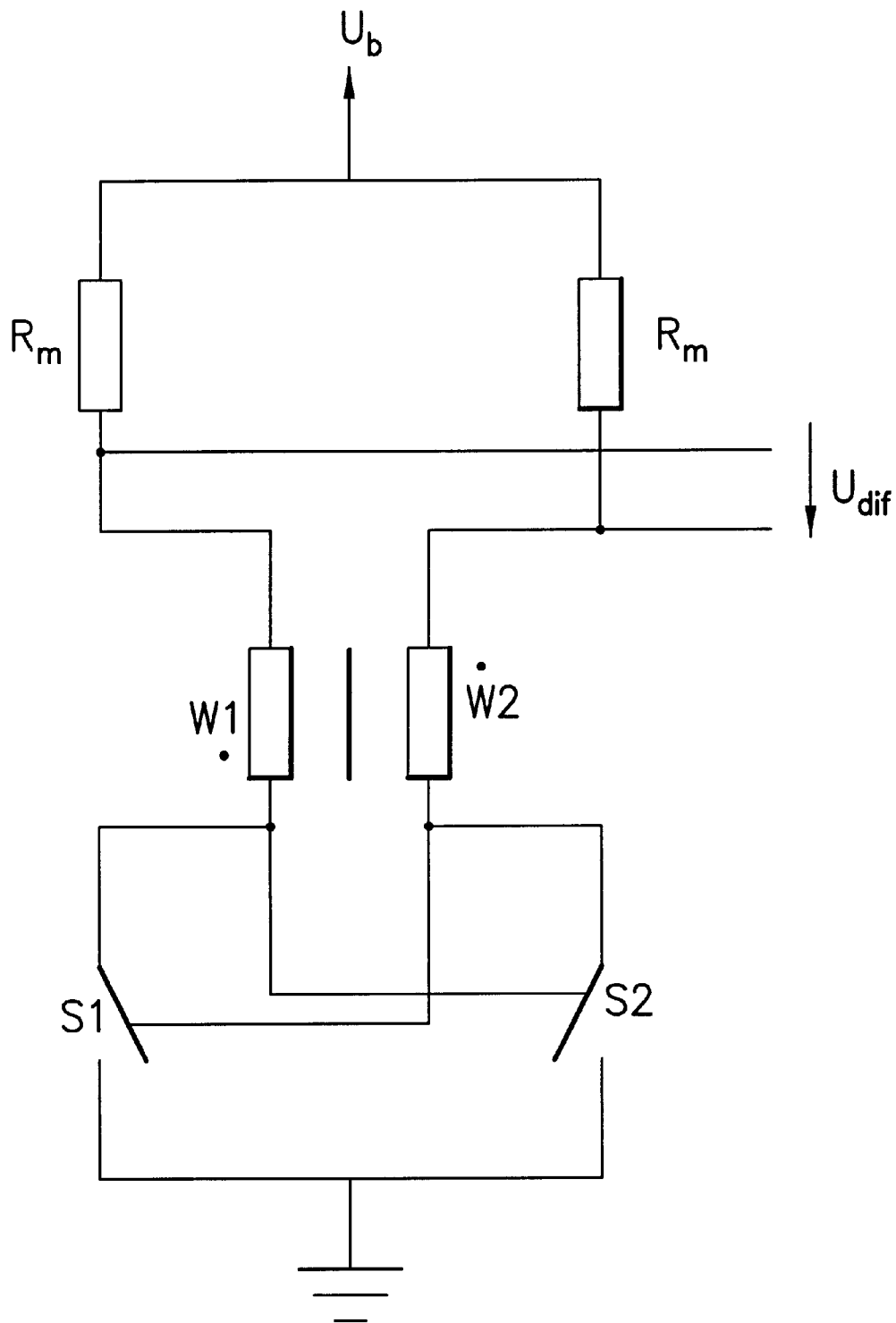
FIG. 6, in a basic illustration, one example of a circuit for a differential current sensor with universal current sensitivity for detecting AC components and DC components.

FIG. 6 illustrates the principle of an exemplary embodiment of a differential current sensor that functions with sensitivity to universal current and can detect AC and DC components of a differential current. For AC and pulsed-current-sensitive differential current measurement, summation current converters are typically employed, which detect the measurement variable by the transformational principle. Differential direct currents cannot be detected by this measuring method, since direct currents do not cause the change in flux that is required for the transformation.

One possibility for measuring the direct current is to evaluate the magnetization of an iron core (flux density B). In a known manner, the characteristic magnetization curve (B-H curve) represents the dependency of the flux density B of a soft magnetic material on the magnetic field intensity H. In principle, the course of the characteristic magnetization curve is symmetrical with regard to a zero point.

In a summation current converter, the differential current generates the magnetic field intensity H, which is dependent on the number of turns in the winding through which current flows and on the mean travel length of the magnet core. This magnetic field intensity generates a magnetic flux B in the magnetic core, from which, as a function of the cross-sectional area of the magnet core, the flux density B can be formed. If the differential current is 0, then the flux density B is also 0 (with the effects of hysteresis being ignored). If the magnet core of the summation current converter is magnetized with a differential direct current, for instance, then because of the magnetic field intensity H, a flux density B that depends on the core material used occurs.

FIG. 6 shows a circuit principle for detection of differential current direct currents as well. The basis for the measurement is an oscillating circuit; the summation current converter serves as an oscillation-generating element. In FIG. 6, the summation current converter comprises two oppositely applied windings W1 and W2 with the same number of turns. The electronic switches (or transistors) S1 and S2 of the oscillator are closed in alternation, so that both windings also carry current in alternation. Because of the contrarily applied windings, the magnet core is magnetized in alternation in both directions, so that the characteristic magnetization curve is run through completely in both directions. The circuit changes state when the magnet core becomes saturated by the winding current. Upon saturation of the magnet core, no change in the winding current occurs (the inductance of the winding becomes negligibly slight) so that no voltage can be induced at the control input of the switch that has been made conducting, either. This switch therefore opens. The opening of the switch caused the voltage $U_B$ (fixed direct supply voltage) to appear at the control input, and on the basis of this an induction voltage of the now shut-off winding is formed. The previously opened switch thereupon closes.

Because the switches close in alternation, the current flow leads to a voltage drop at the measuring resistors $R_m$ whose frequency corresponds to the oscillation frequency. By finding the difference between the two voltage drops, the two branches of the oscillator are evaluated. The differential voltage $U_{dif}$ can in principle be considered to be square wave voltage. The duty cycle is 50%, if no differential current flows, because in each case the same time is needed until the saturation point is reached (point of change of state of the oscillating circuit), beginning at the zero point of the characteristic magnetization curve.

As already noted, a differential direct current leads to a premagnetization of the magnet core. The saturation is reached sooner in the premagnetized direction than in the opposite direction, beginning at the zero point of the characteristic magnetization curve. The duty cycle is now unequal to 50%. As long as the differential current does not saturate the summation current converter, it can largely be assumed that there is a linear dependency between the differential current and the duty cycle of the voltage $U_{dif}$. Finding the difference between the two voltage drops causes the duty cycle to become twice as high as with evaluation of one oscillator branch.

Because of the zero point symmetry of the magnet core, the circuit principle of FIG. 6 is also suitable for differential alternating currents. A differential alternating current likewise "modulates" the magnetizing square wave voltage; as long as the frequency of the differential current is less than half the frequency of the square wave voltage, correct evaluation takes place.

This circuit principle can therefore be employed as a measuring principle with universal current sensitivity; the AC and DC components of the differential current can be recovered from the square wave voltage $U_{dif}$ by means of a low-pass filter. The principle described can also be modified. For instance, it would be possible to use only one winding, which positively and negatively repolarizes the magnet core with a constantly repolarized direct voltage.

What is claimed is:

1. A method for monitoring insulation and fault current in an electrical alternating current (AC) network, in which a differential current, formed by a vectorial addition, between at least two network conductors is ascertained, and furthermore a product of an amplitude of the AC component of the differential current and a cosine of a phase angle φ between the AC component of the differential current and the AC network voltage between at least two conductors of the network is ascertained, and a load shutoff is performed whenever a resistive fault current exceeds a certain response value, characterized in that the differential current, containing AC and DC components, of the AC network is detected with universal current sensitivity;

that the AC component, including both a capacitive component and a resistive component, of the differential current detected with a universal current sensitively, is obtained by a high-pass filtration with a first limit frequency that is below the network frequency;

that the DC component, to be assessed as a resistive fault current signal, of the differential current detected with the universal current sensitivity is obtained by a low-pass filtration with a second limit frequency located below the first limit frequency;

that after the high-pass filtration, for the sake of protecting human beings the AC component of the differential current is weighted as a function of frequency;

that the product of the amplitude of the AC component of the differential current and the cosine of the phase angle φ is ascertained indirectly by an effectiveness measurement;

that in said effectiveness measurement, a multiplication of the AC component of the differential current by a multiplication signal and an ensuing arithmetic averaging are performed, and the multiplication signal corresponds to the AC network voltage, which is kept constant with regard to its effective value, or a second network variable;

that the resistive fault current signal on a DC side and the resistive fault current signal on an AC side ascertained from the AC component are subjected to a quadratic addition in order to ascertain a resistive total fault current signal; and that the load shutoff is performed whenever the resistive total fault current signal exceeds a certain response value.

2. The method of claim 1, characterized in that from the two network variables detected, the phase angle φ between these network variables is determined, and that the product of the amplitude of the AC component of the differential current and the cosine of the phase angle φ is calculated.

3. The method of claim 1, characterized in that the product of the amplitude of the AC component of the differential current and the cosine of the phase angle φ is ascertained indirectly by synchronous rectification (correct-phase rectification).

4. The method of claim 3, characterized in that in the synchronous rectification, a phase-dependent full-travel rectification of the AC component of the differential current and an ensuing arithmetic averaging are performed.

5. The method of claim 3, characterized in that in the synchronous rectification a multiplication of the AC component of the differential current by a multiplication signal and an ensuing arithmetic averaging are performed, and the multiplication signal is a network-synchronous, differential voltage-free square signal or sine wave signal of constant amplitude that is symmetrical to the AC network voltage or to the second network variable.

6. The method of claim 1, characterized in that the resistive fault current ascertained is compared with a lesser response value suitable for protecting human beings;

that the total differential current detected, which includes the AC components and can at the same time include DC components, is compared with a greater response value suitable for protecting property;

and that a load or network shutoff is performed whenever at least one of the response values is exceeded.

7. The method of claim 6, characterized in that the lesser response value and/or the greater response value are adjustable.

8. The method of claim 7, characterized in that the lesser response value for protecting human beings is adapted flexibly to the network conditions prevailing in operation, and the ohmic grounding resistance is measured, and the response value is adjusted such that it corresponds to the quotient of the maximum allowable touch voltage and the ohmic grounding resistance.

9. The method of claim 1, for an AC network with an equipotential bonding conductor, characterized in that for checking the function of the equipotential bonding conductor, the current flowing in the normal situation as a certain component of the total differential current through the equipotential bonding conductor is detected, and that a load or network shutoff is then performed if this current is less than the certain component.

10. The method of claim 1, for an AC network with an equipotential bonding conductor, characterized in that for checking the function of the equipotential bonding conductor, a test current is fed into the equipotential bonding conductor; that this test current, which in the normal situation flows through the equipotential bonding conductor and the ohmic grounding resistance, is detected; and that then a load or network shutoff is performed if an elevation of the total grounding resistance above an allowable value is detectable.

11. The method of claim 1, characterized in that for monitoring a three-phase electrical AC network with or without neutral conductors, the method is performed separately for each of the three network conductors, in that the AC component of the differential current of all three network conductors is detected as a first network variable, furthermore the three AC network voltages between each network conductor and a neutral conductor, or in the absence of the latter between each network conductor and an equipotential bonding conductor, are detected, and the corresponding three products of the amplitude of the AC component of the differential current and the cosine values of the three phase angles φ are ascertained, and the load shutoff is performed whenever one of these products exceeds the certain response value.

12. The method of one claim 1, characterized in that the load or network shutoff is performed with universal polarity.

13. The method of claim 1, characterized in that after a load or network shutoff dictated by the differential current or fault current, or some other network shutoff, the insulation resistance of the shut-off network is measured and compared with a limit value representing the normal situation; and that the load or network is turned back on again only whenever the measured insulation resistance of the network exceeds the limit value.

14. A device for performing the method of claim 1, having a differential current sensor (3) that includes at least two network conductors of an AC network, and having a differential current relay (1), which via a power or load switch (2) performs a load or network shutoff as soon as the differential current (IΔ) exceeds a certain response value, characterized in that the differential current relay (1) has an electronic phase module (13), which from the AC component ($I\Delta_{AC}$) of the differential current (IΔ) which component is ascertained via a high-pass filter (11), and from the AC network voltage or a comparison voltage derived from it, taking into account the phase angle φ, a fault current signal ($If_{AC}$) is ascertained, which represents the AC-dictated resistive fault current of the AC network; and that the phase module (13) is followed by a comparator module (19), which compares the fault current signal ($If_{AC}$) with a lesser response value ($If_g$) suitable for protecting human beings and triggers the load switch (2) to trip it if this response value is exceeded.

15. A device for monitoring insulation and fault current in an electrical alternating current (AC) network having a differential current sensor (3) that includes at least two conductors of an AC network, and having a differential current relay (1), which via a power or load switch (2) performs a load or network shutoff as soon as a differential current (IΔ) exceeds a certain response value, characterized in that the differential current sensor (3) detects the differential current (IΔ) with a universal current sensitivity, including AC and DC components;

that a first low-pass filter (10) connected to the differential current sensor (3) furnishes a fault current signal ($IF_{DC}$) on its output side that represents a DC-dictated resistive fault current of the AC network;

that the differential current relay (1) has an electronic phase module (13), which from the AC component ($IΔ_{AC}$) of the differential current (IΔ) which component is ascertained via a high-pass filter (11), and from a comparison voltage derived from the AC network voltage, taking into account a phase angle φ, a fault current signal ($If_{AC}$) is ascertained, which represents an AC-dictated resistive fault current of the AC network;

that a frequency-weighted second low-pass filter (15) is connected between the high-pass filter (11) and the phase module (13) and simulates the frequency dependency of the human body, which decreases as the frequency increases;

that the outputs of the first low-pass filter (10) and of the phase module (13) are connected to an adder module (14), which quadratically adds the two fault current signals ($If_{AC}$, $If_{DC}$) to form a total fault current signal (IF) on the output side that corresponds to a DC signal;

that the output of the adder module (14) is connected to the input of a comparator module (19), which compares the fault current signal ($If_{AC}$) with a lesser response value ($If_g$) suitable for protecting human beings and triggers the load switch (2) to trip it if this response value is exceeded.

16. The device of claim 15, characterized in that the comparator module (19) is connected on the input side, for taking the total differential current (IΔ) into account, directly with the differential current sensor (3) as well and has two adjusting means (16, 17) for specifying a lesser response value ($If_g$) for the fault current signal (IF) and a greater response value ($IΔ_g$) for the total differential current IΔ.

17. The device of claim 15, characterized in that for voltage supply, the electronically constructed differential current relay (1) has a power supply (4) which is supplied from the AC network and is embodied with a constantly operating functional self-monitoring means, which even in the event of malfunctions of the differential current relay (1) leads to a load or network shutoff by the differential current relay (1).

18. The device of claim 15, characterized in that the differential current relay (1), in three-phase AC networks, has a power supply with a voltage supply that is redundant on the network side and assures that in the event of a phase failure or a neutral conductor failure, the differential current relay (1) will continue to operate as long as two phases, or one phase and the neutral conductor, are still available.

19. The device of claim 15, characterized in that a storage capacitor (5) charged by the power supply (4) is present, which in the event of failure of the internal voltage supply of the apparatus temporarily furnishes the energy for operating portions (18, 21, 22) of the differential current relay (1) and causes the load switch (2) to be tripped whenever, in a multiphase network, all the network phases except for one have failed, or in a single-phase network if the neutral conductor has failed.

20. The device of claim 15, characterized in that for monitoring the equipotential bonding conductor (PE) of the AC network, a current converter or differential current sensor (25) includes the equipotential bonding conductor (PE) and is connected to the comparator module (19), and a load or network shutoff is effected if the output signal of the current converter or differential current sensor (25) indicates an elevation of the grounding resistance ($R_G$) above an allowable value.

21. The device of claim 15, characterized in that for monitoring the equipotential bonding conductor (PE) of the AC network, the equipotential bonding conductor is carried through two current converters; that the first current converter impresses a low test current into the loop formed by the equipotential bonding conductor (PE) and the grounding resistance ($R_G$); that the second current converter detects this test current; and that a load or network shutoff is effected if the output signal of the second current converter becomes less than a certain proportion that indicates an elevation of the resistance ($R_{PE}$) of the protective conductor or equipotential bonding conductor above an allowable value.

22. The device of claim 15, characterized in that the comparator module (19) is connected to a digital interface (20, 23), to which at least one additional means can be connected, such as a measurement data display means and/or an insulation monitoring device that monitors the insulation resistance of the network to be monitored in the off state, but including the consumers connected to the network, and/or a means for monitoring the resistance of the equipotential bonding conductor (PE).

23. The device of claim 15, characterized in that the fault current or differential current relay (1), the differential current sensor (3), and the load or power switch (2) are combined into a structural module, or are distributed between two structural modules with separate load switches (2), or are distributed to three structural modules.

24. The device of claim 15, characterized in that the differential current sensor (2) with universal current sensitivity for detecting the AC components and DC components has, in a manner known per se, a soft-magnetic core surrounding at least two network conductors of the AC network to be monitored, the core having two contrary windings (W1, W2) with the same number of turns and also has two electronic switches (S1, S2) that operate in alternation, and these elements are components of an oscillation circuit, and the oscillation signal on the output side, with universal current sensitivity, represents a total differential current flowing through the core.

* * * * *